(12) United States Patent
Pogosyan et al.

(10) Patent No.: US 9,180,974 B2
(45) Date of Patent: Nov. 10, 2015

(54) AIRCRAFT WITH AN INTEGRAL AERODYNAMIC CONFIGURATION

(75) Inventors: Mihail Aslanovich Pogosyan, Moscow (RU); Aleksandr Nikolaevich Davidenko, Moscow (RU); Mihail Yurievich Strelets, Moskovskaya obl. (RU); Vladimir Aleksandrovich Runishev, Moscow (RU); Aleksey Zaharovich Tarasov, Moscow (RU); Aleksey Kirillovich Shokurov, Moscow (RU); Sergey Yurievich Bibikov, Moscow (RU); Leonid Evgenievich Krylov, g. Odintsovo (RU); Pavel Borisovich Moskalev, Moscow (RU)

(73) Assignee: OTKRYTOE AKCIONERNOE OBSCHESTVO "AVIACIONNAYA HOLDINGOVAYA KOMPANIYA SUHOI", Moscow (RU)

( * ) Notice: Subject to any disclaimer, the term of this patent is extended or adjusted under 35 U.S.C. 154(b) by 354 days.

(21) Appl. No.: 13/812,602

(22) PCT Filed: Apr. 7, 2011

(86) PCT No.: PCT/RU2011/000229
§ 371 (c)(1),
(2), (4) Date: May 7, 2013

(87) PCT Pub. No.: WO2012/026846
PCT Pub. Date: Mar. 1, 2012

(65) Prior Publication Data
US 2014/0145027 A1     May 29, 2014

(30) Foreign Application Priority Data
Jul. 28, 2010 (RU) .................................. 2010131640

(51) Int. Cl.
*B64D 33/00* (2006.01)
*B64D 27/20* (2006.01)
(Continued)

(52) U.S. Cl.
CPC . *B64D 27/20* (2013.01); *B64C 3/10* (2013.01); *B64C 5/02* (2013.01); *B64C 15/02* (2013.01);
(Continued)

(58) Field of Classification Search
CPC .... B64D 2033/0286; B64C 3/10; B64C 5/02; B64C 15/02
USPC .................................................. 244/53 R, 88
See application file for complete search history.

(56) References Cited

U.S. PATENT DOCUMENTS 3,540,221 A * 11/1970 Bauger et al. .................... 60/244
4,025,007 A *  5/1977 Kaniut ............................. 244/15
(Continued)

FOREIGN PATENT DOCUMENTS

| GB | 1029106 | * | 5/1966 |
| GB | 1029106 A | | 5/1966 |
| RU | 2140376 C1 | | 10/1999 |

OTHER PUBLICATIONS

International Search Report—PCT/RU2011/000229—Mailing Date: Sep. 8, 2011.

*Primary Examiner* — Justin Benedik
(74) *Attorney, Agent, or Firm* — Banner & Witcoff, Ltd.

(57) ABSTRACT

The invention relates to multimode aircraft operated at supersonic and subsonic flight speeds in a wide range of flight altitudes. The invention is particularly applicable in multimode super-maneuverable aircraft capable of cruising at supersonic speed and having low radar signature. The technical effect to be achieved by the invention is to provide an aircraft which has low radar signature, is super-maneuverable at high angles of attack, has high aerodynamic efficiency at supersonic speeds while keeping high aerodynamic efficiency at subsonic modes, and can accommodate bulky cargo in its internal compartments. The integral aerodynamic configuration aircraft comprises fuselage (1) with strake (2), wing with panels (3) smoothly blended into fuselage (1), all-moving horizontal tail (AMHT) (4), and all-moving vertical tail (AMVT) (5). Mid-fuselage is flattened and formed longitudinally by a set of aerodynamic profiles. Engines are arranged in engine nacelles (6) spaced apart from each other horizontally, and centerlines of engines are oriented at an acute angle to the plane of symmetry of the aircraft in the direction of flight. Strake (2) comprises controlled pivoting portions (8).

10 Claims, 2 Drawing Sheets

(51) Int. Cl.
  *B64C 3/10* (2006.01)
  *B64C 5/02* (2006.01)
  *B64D 33/02* (2006.01)
  *B64C 15/02* (2006.01)
  *B64D 7/00* (2006.01)

(52) U.S. Cl.
  CPC  *B64D 7/00* (2013.01); *B64D 33/02* (2013.01); *B64D 2033/0286* (2013.01); *Y02T 50/12* (2013.01); *Y02T 50/44* (2013.01)

(56) References Cited

U.S. PATENT DOCUMENTS

| | | | | |
|---|---|---|---|---|
| 4,037,808 | A | * | 7/1977 | Kaniut ........................ 244/53 B |
| 4,456,204 | A | * | 6/1984 | Hapke ......................... 244/53 R |
| 5,005,782 | A | * | 4/1991 | Falempin et al. ........... 244/53 B |
| 5,586,735 | A | * | 12/1996 | Falempin et al. ........... 244/53 B |
| 5,957,405 | A | * | 9/1999 | Williams ....................... 244/15 |
| 2006/0254254 | A1 | * | 11/2006 | Saddoughi et al. ............. 60/204 |

* cited by examiner

AIRCRAFT WITH AN INTEGRAL AERODYNAMIC CONFIGURATION

CROSS-REFERENCE TO RELATED APPLICATIONS

This application is a U.S. National Stage application under 35 U.S.C. §371 of International Application PCT/RU2011/000229 (published as WO 2012/026846 A1), filed Apr. 7, 2011, which claims priority to Application RU 2010131640, filed Jul. 28, 2010. Benefit of the filing date of each of these prior applications is hereby claimed. Each of these prior applications is hereby incorporated by reference in its entirety.

The invention relates to multimode aircrafts operated at supersonic and subsonic flight speeds in a wide range of flight altitudes. The invention is particularly applicable in multimode super-maneuverable aircrafts which are able to cruise at supersonic speed and have a low radar signature.

Creation of an aircraft which is capable to fulfill tasks in a wide range of altitudes and flight speeds, exhibits super-maneuverability while having a low radar signature is a difficult technical challenge.

Aerodynamic configuration of the aircraft should provide maximum aerodynamic efficiency (increase lift component and reduce drag component) at subsonic and supersonic flight speeds, and ensure controllability at ultra-low flight speeds. The external shape of the airframe should provide reduced radar signature. All of these requirements are contradictory, and creation of an aircraft that meets such demands is a compromise.

The most relevant aircraft combines features of a multimode supersonic aircraft having super-maneuverability and low radar signature. The aircraft is constructed according to the normal balancing scheme with all-moving horizontal tail for longitudinal-axis control (control of pitch) of the aircraft in all flight modes. In addition to longitudinal-axis control, the all-moving horizontal tail is used for roll control of the aircraft by differential deflection in supersonic flight modes.

A tapered wing has a swept forward trailing edge, which allows high values of chord lengths in the root to reduce the relative wing thickness in this area with high absolute thickness of the wing. This solution is aimed at reducing the wave drag at transonic and supersonic flight speeds and at increasing the fuel load in wing tanks at the same time.

The wing leading edge devices comprise an adaptive wing leading edge flap used to increase the aerodynamic efficiency in subsonic cruising, improve flow over the wing at high angles of attack, as well as to improve maneuvering characteristics.

Trailing edge devices include:
flaperons used for lift control at takeoff and landing, as well as for roll control in trans- and supersonic flight;
ailerons used for roll control at takeoff and landing.

Two vertical tail panels, consisting of tail fins and rudders, provide directional axis stability and control, and air braking. Directional axis control is provided by synchronous deflection of rudders, while air braking is provided by differential deflection of rudders. Chord planes of vertical tail panels are vertically deflected at an acute angle, thereby reducing the radar signature of the aircraft in the lateral hemisphere.

Engine air intakes are disposed on sides of the fuselage. Planes of air intake inlet are canted in two planes, thereby providing a steady stream of air entering the engines in all flight modes, including the flight at high angles of attack.

Aircraft engines are disposed in the aft portion close to each other so that the position of air intakes on the fuselage sides allows for curved shape of air intake ducts. This solution is used for reducing the radar signature of the engine, and as a result, that of the aircraft as a whole, in the forward hemisphere owing to screening the engine compressors by the air intake duct structure. Doors of "planar" jet nozzles, which are deflectable in vertical planes, allow for thrust vector control, which, in turn, enables pitch axis control of the aircraft in low-speed flight modes, and provides, together with the all-moving horizontal tail, a margin of the negative pitching moment at supercritical angles of attack. Such a solution provides super-maneuverability (Lockheed Martin F/A-22 Raptor: Stealth Fighter. Jay Miller. 2005.)

The aircraft, however, has the following shortcomings:
roll and yaw axis control is infeasible in low speed flight because the engines are close to each other and this fact prevents the provision of a sufficient control moment;
arrangement of the engines close to each other makes impossible the arrangement of freight compartments in the fuselage;
curved shape of air intake ducts requires increasing their length, and thus the weight of the aircraft;
it is impossible to ensure "recovery" of the aircraft from supercritical angles of attack when the engine jet nozzle control system fails;
the use of fixed fins with rudders requires increasing the necessary vertical tail area to provide directional stability in supersonic flight modes, which leads to increasing the weight of tail, and, consequently, that of the aircraft as a whole, as well as increases drag.

The technical effect to be achieved by the invention is to provide an aircraft having low radar signature, super-maneuverability at high angles of attack, high aerodynamic efficiency at supersonic speeds while maintaining the high aerodynamic efficiency in subsonic modes, and the possibility of accommodating bulky cargo in the inner compartments.

Said technical effect is achieved by an integral aerodynamic configuration aircraft, comprising a fuselage, a wing with panels smoothly blended into the fuselage, horizontal and vertical tails, and a twin-engine power plant, wherein the fuselage comprises a strake disposed above inlets of engine air intakes and having controlled pivoting portions; a mid-fuselage being flattened and formed longitudinally by a set of aerodynamic profiles; engine nacelles being horizontally spaced apart from each other, and centerlines of the engines being oriented at an acute angle to the plane of symmetry of the aircraft in the direction of flight.

Furthermore, the vertical tail is an all-moving synchronously and differentially deflectable tail.

Furthermore, the all-moving vertical tail is mounted on pylons that are disposed on side tailbooms of the fuselage, while air intakes for blowing down engine compartments and heat exchangers of air conditioning system are disposed on the front of the pylons.

Furthermore, the horizontal tail is an all-moving synchronously and differentially deflectable tail.

Furthermore, engine jet nozzles are synchronously and differentially deflectable.

Furthermore, the inlets of the engine air intakes are disposed on sides of the fuselage nose behind the cockpit, a lower edge of the inlets of the engine air intakes being disposed beneath the fuselage contours.

Furthermore, the inlets of the engine air intakes are canted in two planes—with respect to the vertical longitudinal and transverse planes of the aircraft.

Furthermore, chord planes of the panels of the all-moving vertical tail are deflected from the vertical plane at an acute angle.

Furthermore, leading edges of the pivoting portion of the strake, wing panels and horizontal tail are parallel to each other.

Furthermore, trailing edges of the wing and horizontal tail are parallel to each other.

The invention will be described with reference to the attached drawings, in which.

Figure 1:
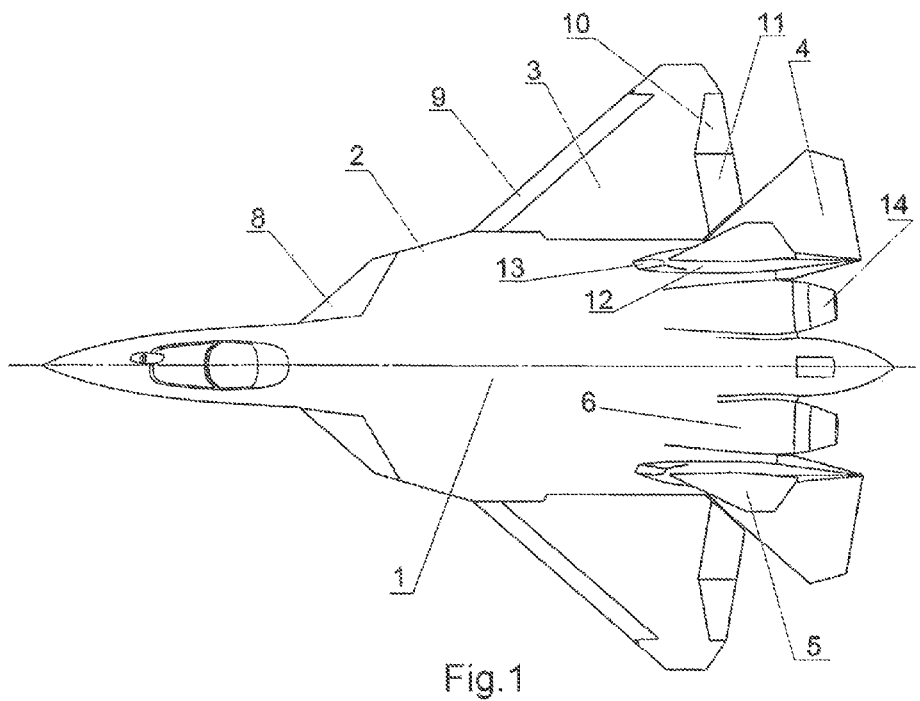
FIG. 1 is a plan view of an integral aerodynamic configuration aircraft.
Figure 2:
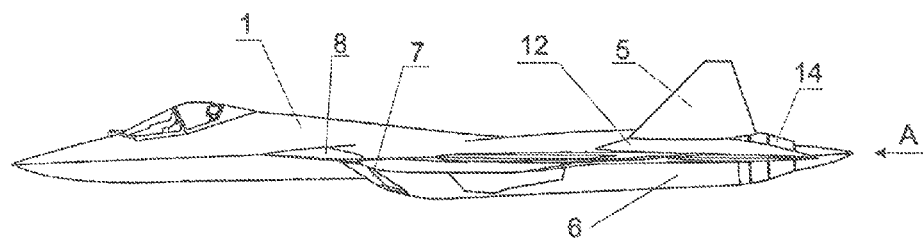
FIG. 2 is a side view of an integral aerodynamic configuration aircraft.
Figure 3:
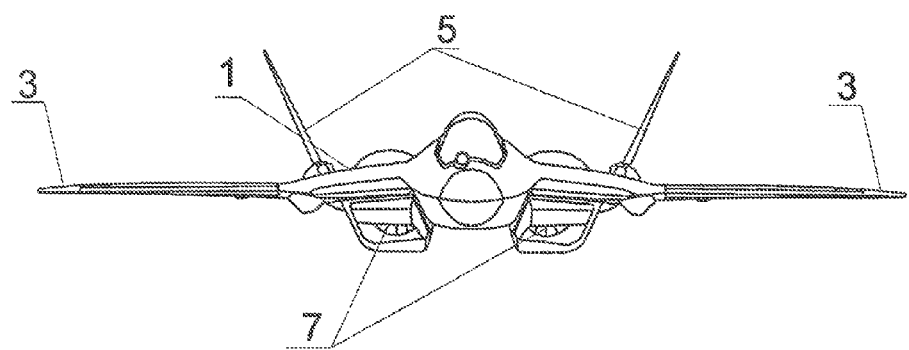
FIG. 3 is front view of an integral aerodynamic configuration aircraft.

Reference numerals in the drawings designate as follows:
1—fuselage
2—fuselage strake
3—wing panels
4—panels of all-moving horizontal tail (AMHT)
5—panels of all-moving vertical tail (AMVT)
6—engine nacelles
7—engine air intakes
8—controlled pivoting portions of the fuselage strake
9—wing leading edge flaps
10—ailerons
11—flaperons
12—AMVT pylon
13—air intakes for blowing down engine compartments and heat exchangers of the air conditioning system
14—vectorable jet nozzles of engines
15—exit of vectorable jet nozzles of engines
16—axes of rotation of vectorable jet nozzles of engines
17—planes of rotation of vectorable jet nozzles of engines.

An integral aerodynamic configuration aircraft is a monoplane constructed according to the normal balancing scheme and comprising a fuselage 1 with a strake 2, a wing with panels 3 smoothly blended into the fuselage 1, an all-moving horizontal tail (hereinafter referred to as "AMHT") 4, an all-moving vertical tail (hereinafter referred to as "AMVT") 5, a twin-engine power plant, the engines of which are accommodated in nacelles 6. The nacelles 6 are spaced apart from each other horizontally, while centerlines of the engines are oriented at an acute angle to the plane of symmetry of the aircraft in the direction of flight.

The strake 2 of the fuselage 1 is disposed above air intakes 7 of the engines and includes controlled pivoting portions 8. The pivoting portions 8 of the strake 2 are leading edges of a flattened mid-fuselage part 1.

Wing panels 3 smoothly blended into the fuselage 1 comprise leading and trailing edge devices, which include wing leading edges flaps 9, ailerons 10 and flaperons 11.

AMHT 4 is mounted on side tailbooms of the fuselage 1. AMVT 5 is mounted on the pylons 12 secured on side tailbooms of the fuselage 1. Air intakes 13 for blowing down engine compartments and heat exchangers of an air conditioning system are arranged at the front of the pylons 12. The arrangement of the AMVT 5 on the pylons 12 increases the bearing arm of the AMVT 5, which, in turn, reduces reactive loads on the primary components of the aircraft airframe and, therefore, reduces the weight. The increased bearing arm of the AMVT 5 is provided by the fact that an upper bearing is inside the pylon 12, and this fact allows the bearing arm (distance between bearings) to be increased. In addition, pylons 12 are hydraulic actuator fairings of the AMVT 5 and AMHT 4, which allows increasing the freight compartment capacity between the nacelles 6 owing to taking the hydraulic actuators out of the fuselage 1.

Inlets of the engine air intakes 7 are disposed on each side of the fuselage 1 nose, behind the cockpit, under the pivoting portions 8 of the strake 2 and canted in two planes: with respect to the vertical longitudinal and transverse planes of the aircraft, the lower edge of inlets of the engine air intakes 7 being disposed beneath the fuselage 1 contours.

Figure 4:
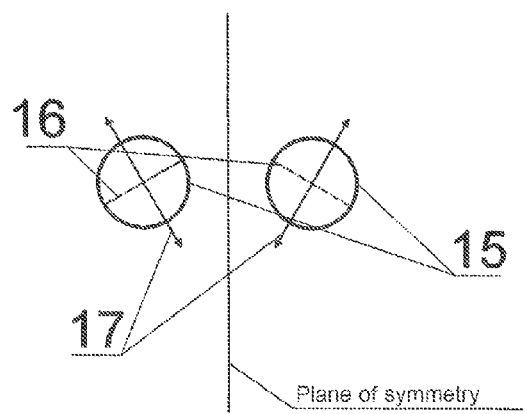
FIG. 4 is view A in FIG. 2.

The engines comprise axisymmetric vectorable jet nozzles 14, which are rotatable in planes oriented at an angle to the plane of symmetry of the aircraft. The jet nozzles 14 are able to perform synchronous and differential deflection to control the aircraft by deflection of the thrust vector. FIG. 4 shows schematically the orientation of vectorable jet nozzles 14, wherein reference numeral 15 stands for exits of the vectorable jet nozzles 14; reference numeral 16 stands for axes of rotation of the vectorable jet nozzles 14, and reference numeral 7 stands for the plane of rotation of the vectorable jet nozzles 14.

The aircraft has a low radar signature and is capable of fulfilling tasks in a wide range of altitudes and flight speeds owing to its super-maneuverability.

Increased aerodynamic efficiency at subsonic flight speeds is achieved through the formation of the surface of the mid-fuselage 1 (except for the nose and aft portions) longitudinally (in longitudinal sections) by a set of aerodynamic profiles and the use of pivoting portions 8 of the strake 2, which allow the fuselage surface to be involved in lift creation.

High aerodynamic efficiency at subsonic flight speeds is achieved through the use of a wing with panels 3 having tapered planform with a great sweep on the leading edge, high tapering, large length of the root chord and small length of the end chord. The set of features allows implementing a small relative thickness of the wing at large values of the absolute height of the wing, especially in the root, thereby reducing the growth of drag force occurring at transonic and supersonic speeds.

AMHT 4 enables longitudinal-axis control of the aircraft at synchronous deflection, and lateral-axis control at differential deflection at trans- and supersonic flight speeds.

AMVT 5 provides stability and directional-axis control at all flight speeds and the air braking function. Stability at supersonic flight speeds at insufficient required static area is provided by deflection of AMVT 5 panels entirely. In the event of atmospheric disturbance or gust the AMVD 5 panels are deflected in the directional axis towards disturbance attenuation. This feature allows the area of tails to be reduced, thereby decreasing the weight and drag of the tails and the aircraft in general. Directional-axis control is carried out at synchronous deflection of AMVT 5, while air braking is carried out at differential deflection of AMVT 5.

Wing devices are used to control lift and roll. Wing leading edge flap 9 is used to increase the critical angle of attack and ensure shock-free flow over the wing, to fly "on envelope polar" in takeoff, landing, maneuvering and cruising subsonic flight modes. Ailerons 10 are adapted to provide roll control of the aircraft at differential deflection at takeoff and landing modes. Flaperons 11 are adapted to control lift increment at synchronous deflection downward at takeoff and landing modes, and for roll control at differential deflection.

When deflected down, the pivoting portion 8 of the strake 2 of the fuselage 1 reduces the plan projection area of the fuselage 1 in front of the center of mass of the aircraft, which contributes to the creation of excess negative pitching moment in flight at angles of attack close to 90 degrees. Thus, in the event of failure of the control system of jet nozzles 14 it will be possible to switch from the flight at supercritical angles of attack to the flight at low angles of attack without controlling the aircraft by engines thrust vectoring. At the same time, the pivoting portion 8 of the strake 2 is the leading edge device of the strake 2 of the fuselage 1. Being deflected down in cruise mode, the pivoting portion 8 of the strake 2 functions similarly to the wing leading edge flap 9.

The use of side air intakes disposed under the pivoting portion 8 of the strake 2 ensures stable operation of the engines in all flight modes of the aircraft, in all attitudes owing to equalizing ram air at high angles of attack and slip.

Arrangement of the engines in isolated nacelles 6 allows arranging a compartment for bulky cargo between them. To counteract the yawing moment where one of the engines fails, centerlines of the engines are oriented at an acute angle to the plane of symmetry of the aircraft so that the thrust vector of the operating engine is closer to the center of mass of the aircraft. Such arrangement of engines, along with the use of vectorable jet nozzles 14, which are rotatable in planes inclined at an acute angle to the plane of symmetry of the aircraft, allows the aircraft control with the aid of thrust vector of the engines in the longitudinal, lateral and directional axes. Longitudinal-axis control is carried out at synchronous deflection of vectorable jet nozzles 14, which create pitch moment about the center of mass of the aircraft. Side-axis control of the aircraft is carried out by differential deflection of the jet nozzles 14, creating roll and yaw moments at the same time, with the roll moment being counteracted by deflection of aerodynamic controls (ailerons 10 and flaperons 11). Lateral-axis control of the aircraft is performed at differential deflection of the vectorable jet nozzles 14, creating roll moment about the center of mass of the aircraft.

Radar signature of the aircraft is reduced owing to the combination of design and technology measures, including, in particular, shaping of the airframe contours featuring:

parallelism of leading edges of the pivoting portion 8 of the strake 2, wing panels 3 and horizontal tail 4; parallelism of trailing edges of the wing panels 3 and horizontal tail 4, which allows localizing peaks of electromagnetic waves reflected from lifting surface of the airframe and thus reducing the overall radar signature of the aircraft in the azimuth plane;

orientation of tangents to the contour of fuselage cross-sections, including the cockpit canopy, at an angle to the vertical plane (the plane of symmetry of the aircraft), which contributes to the reflection of electromagnetic waves incident on the airframe components from side angles into upper and lower hemisphere, thereby reducing the overall radar signature of the aircraft in lateral hemisphere;

canting of inlets of engine intakes in two planes—relative to vertical longitudinal and transverse planes of the aircraft, which ensures reflection of electromagnetic waves, incident on the air intake inlets from the front and side angles, away from the radiation source and thereby reduces the overall radar signature of the aircraft at these angles.

The invention claimed is:

1. An integral aerodynamic configuration aircraft, comprising a fuselage, a wing with panels smoothly blended into the fuselage, a horizontal tail and a vertical tail, and a twin-engine power plant, wherein the fuselage comprises a strake disposed above inlets of engine air intakes and having controlled pivoting portions; a mid-fuselage being flattened and formed longitudinally by a set of aerodynamic profiles; engine nacelles being horizontally spaced apart from each other, and centerlines of the engines being oriented at an acute angle to a plane of symmetry of the aircraft in a direction of flight.

2. An aircraft according to claim 1, wherein the vertical tail is an all-moving, tail capable of synchronous and differential deflecting.

3. An aircraft according to claim 2, wherein the all-moving vertical tail is mounted on pylons that are disposed on side tailbooms of the fuselage, and air intakes for blowing down engine compartments and heat exchangers of an air conditioning system are disposed on front part of the pylons.

4. An aircraft according to claim 1, wherein the horizontal tail is an all-moving tail capable of synchronous and differential deflecting.

5. An aircraft according to claim 1, wherein jet nozzles of the engines are capable of synchronous and differential deflecting.

6. An aircraft according to claim 1, wherein the inlets of the engine air intakes are disposed on sides of a fuselage nose behind a cockpit, the lower edge of the inlets of the engine air intakes being disposed beneath the fuselage contours.

7. An aircraft according to claim 1, wherein the inlets of the engine air intakes are canted in two planes—with respect to vertical longitudinal and transverse planes of the aircraft.

8. An aircraft according to claim 1, wherein the vertical tail is an all-moving tail and chord planes of the panels of the tail are deflected from the vertical plane at an acute angle.

9. An aircraft according to claim 1, wherein leading edges of the pivoting portion of the strake, the wing panels and the horizontal tail are parallel to each other.

10. An aircraft according to claim 1, wherein trailing edges of the wing and the horizontal tail are parallel to each other.

* * * * *